(12) United States Patent
Ogawa et al.

(10) Patent No.: US 11,081,870 B2
(45) Date of Patent: Aug. 3, 2021

(54) BUS BAR UNIT, MOTOR, ELECTRIC POWER STEERING DEVICE

(71) Applicant: Nidec Corporation, Kyoto (JP)

(72) Inventors: Kosuke Ogawa, Kyoto (JP); Takashi Seguchi, Kyoto (JP); Shunsuke Murakami, Kyoto (JP); Takao Atarashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 127 days.

(21) Appl. No.: 16/486,174

(22) PCT Filed: Jan. 30, 2018

(86) PCT No.: PCT/JP2018/002866
§ 371 (c)(1),
(2) Date: Aug. 15, 2019

(87) PCT Pub. No.: WO2018/159187
PCT Pub. Date: Sep. 7, 2018

(65) Prior Publication Data
US 2019/0379195 A1    Dec. 12, 2019

(30) Foreign Application Priority Data

Mar. 3, 2017   (JP) .............................. JP2017-040735

(51) Int. Cl.
*H02K 5/02*     (2006.01)
*H02G 5/02*     (2006.01)
(Continued)

(52) U.S. Cl.
CPC ............. *H02G 5/02* (2013.01); *B62D 5/0403* (2013.01); *H02K 1/12* (2013.01); *H02K 1/22* (2013.01); *H02K 3/04* (2013.01)

(58) Field of Classification Search
CPC .......... B62D 5/0403; H02G 5/02; H02K 1/12; H02K 1/22; H02K 3/04; H02K 11/00; H02K 2203/09
(Continued)

(56) References Cited

U.S. PATENT DOCUMENTS

| 10,742,003 | B2 * | 8/2020 | Takahashi | .............. H02K 21/14 |
| 2009/0058215 | A1 * | 3/2009 | Murakami | ............. H02K 3/522 |
| | | | | 310/208 |

(Continued)

FOREIGN PATENT DOCUMENTS

| JP | 2010-154701 A | 7/2010 |
| JP | 2015-133772 A | 7/2015 |
| JP | 2016-059209 A | 4/2016 |

OTHER PUBLICATIONS

Official Communication issued in International Patent Application No. PCT/JP2018/002866, dated Mar. 20, 2018.

*Primary Examiner* — Tulsidas C Patel
*Assistant Examiner* — Rashad H Johnson
(74) *Attorney, Agent, or Firm* — Keating & Bennett

(57) ABSTRACT

A bus bar unit includes a bus bar holder and bus bars. The bus bar holder is provided on an upper side of a stator disposed in a ring around a central axis extending in a vertical direction. The bus bars are supported by the bus bar holder and connected to coil wires extending from the stator. The bus bars are plate-shaped conductors and are supported by the bus bar holder with a plate surface facing in the vertical direction. The bus bars include coil connecting portions connected to the coil wires, and a bus bar body portion connecting the coil connecting portions through a radially inner side of the plurality of the coil connecting portions, respectively, and at least one bus bar crosses over an upper side or a lower side of at least one of the other bus bars.

17 Claims, 4 Drawing Sheets

(51) Int. Cl.
*B62D 5/04* (2006.01)
*H02K 1/12* (2006.01)
*H02K 1/22* (2006.01)
*H02K 3/04* (2006.01)

(58) Field of Classification Search
USPC .......................................... 310/68 R, 71, 89
See application file for complete search history.

(56) References Cited

U.S. PATENT DOCUMENTS

| 2015/0076944 | A1* | 3/2015 | Shim ..................... | H02K 3/28 |
| | | | | 310/71 |
| 2016/0329772 | A1* | 11/2016 | Fukunaga .............. | H02K 5/225 |
| 2020/0059124 | A1* | 2/2020 | Yamashita ............ | H02K 3/522 |

\* cited by examiner

BUS BAR UNIT, MOTOR, ELECTRIC POWER STEERING DEVICE

CROSS REFERENCE TO RELATED APPLICATIONS

This is a U.S. national stage of PCT Application No. PCT/JP2018/002866, filed on Jan. 30, 2018, and priority under 35 U.S.C. § 119(a) and 35 U.S.C. § 365(b) is claimed from Japanese Application No. 2017-040735, filed Mar. 3, 2017, the entire disclosures of each application being hereby incorporated herein by reference.

1. FIELD OF THE INVENTION

The present disclosure relates to a bus bar unit, a motor, and an electric power steering device.

2. BACKGROUND

Conventionally, a bus bar unit is known in which a plurality of bus bars connecting a coil wire of a motor and external connection terminals are formed into a unit by resin molding. For example, a terminal in which a plurality of bus rings is disposed on one plane to reduce the thickness in the vertical direction.

When a plurality of bus bars are arranged in a planar manner, it is necessary to make some of the bus bars turn away toward the outer peripheral side in order to connect a coil wire and an external connection terminal. Therefore, there has been a problem that the bus bars are elongated to increase the resistance, or that the mounting area of the bus bar becomes greater thereby limiting the arrangement of the connectors and the like.

SUMMARY

According to an aspect of an example embodiment of the present disclosure, a bus bar unit includes a bus bar holder provided on an upper side of a stator disposed annularly around a central axis extending in a vertical direction, and three bus bars supported by the bus bar holder and connected to coil wires extending from the stator, wherein three of the bus bars are defined by plate-shaped conductors, and supported by the bus bar holder with the plate surface facing up and down, each of the bus bars includes a plurality of coil connecting portions connected to the coil wires, and a bus bar body portion connecting the coil connecting portions through a radially inner side of the plurality of the coil connecting portions, and at least one of the bus bars crosses over an upper side or a lower side of at least one other of the bus bars.

The above and other elements, features, steps, characteristics and advantages of the present disclosure will become more apparent from the following detailed description of the example embodiments with reference to the attached drawings.

DETAILED DESCRIPTION

Figure 1:
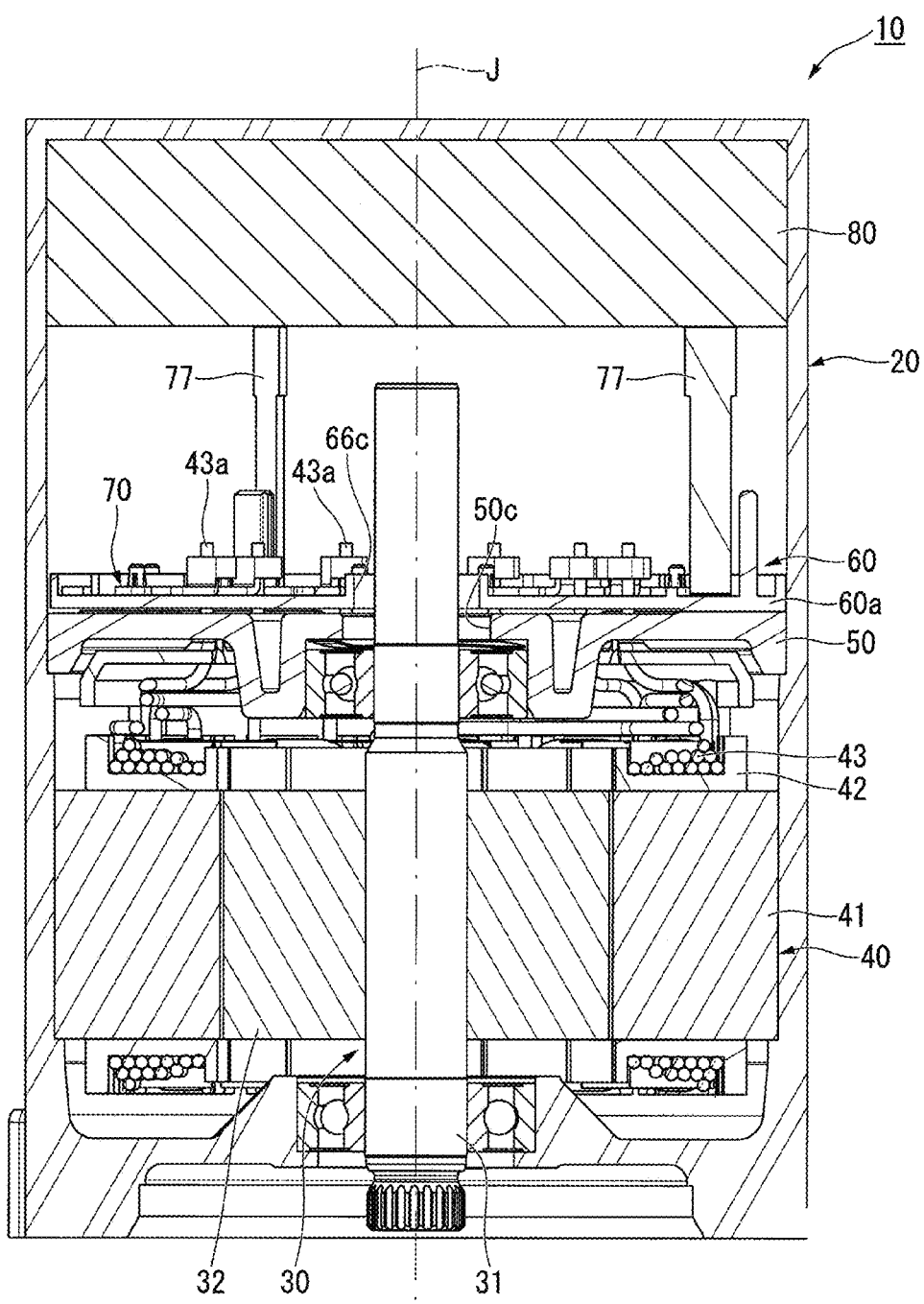
FIG. 1 is a cross-sectional view of a motor of an example embodiment of the present disclosure.
Figure 2:
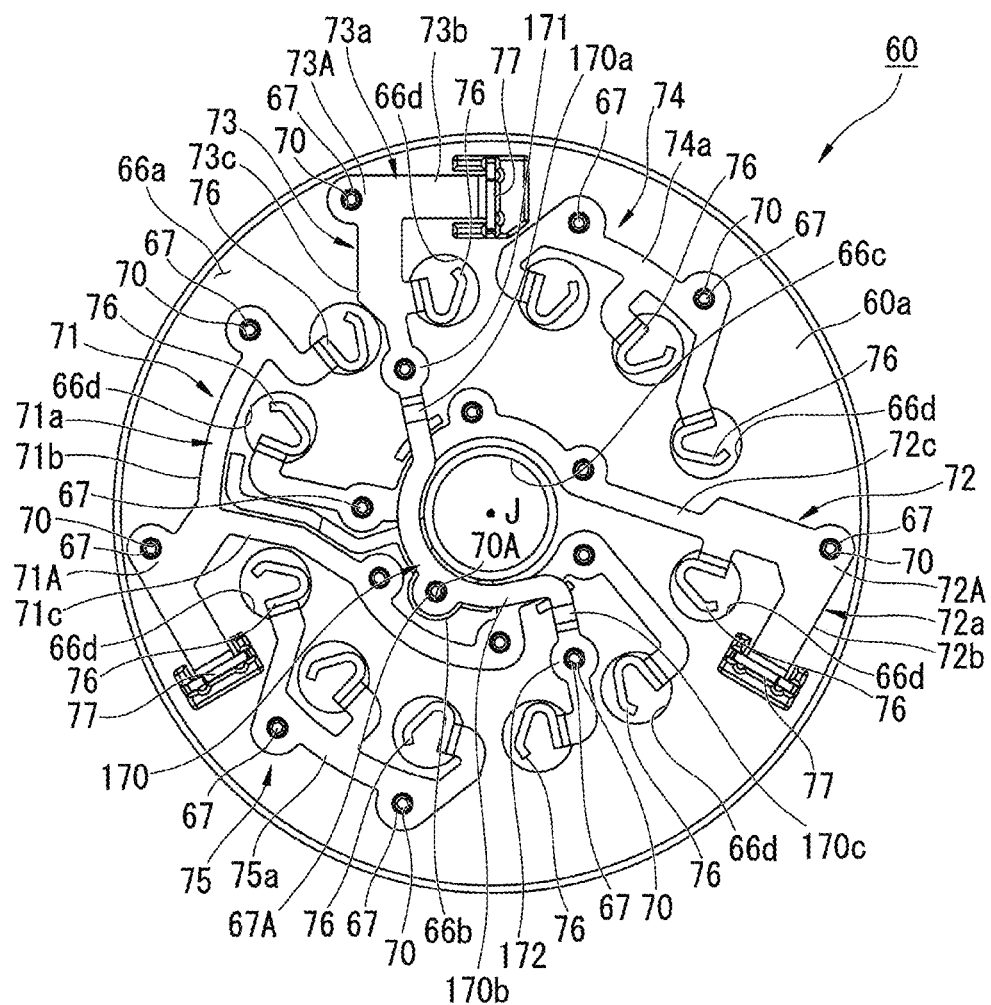
FIG. 2 is a plan view of a bus bar unit of an example embodiment of the present disclosure.
Figure 3:
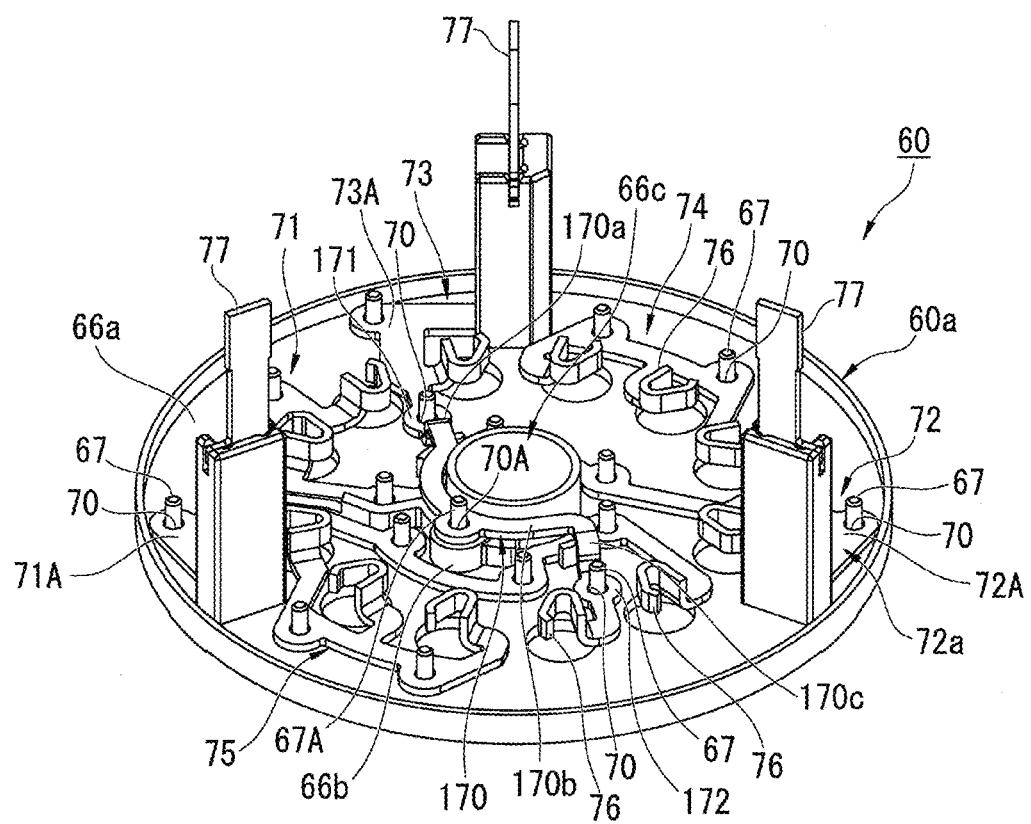
FIG. 3 is a perspective view of a bus bar unit of an example embodiment of the present disclosure.

FIG. 1 is a cross-sectional view of a motor of an example embodiment. FIG. 2 is a plan view of a bus bar unit of an example embodiment. FIG. 3 is a perspective view of a bus bar unit of an example embodiment.

As shown in FIG. 1, the motor 10 of the present example embodiment includes a rotor 30, a stator 40, a housing 20, a bearing holder 50, a bus bar unit 60, and a controller 80. The rotor 30 has a shaft 31 and a rotor core 32. The shaft 31 is disposed along the central axis J extending in the vertical direction. The rotor core 32 is fixed to the outer peripheral surface of the shaft 31.

In the following description, the direction parallel to the central axis J is simply referred to as the "vertical direction", the radial direction about the central axis J is simply referred to as the "radial direction", and the circumferential direction around the central axis J is simply referred to as the "circumferential direction". In addition, the upper side in the vertical direction in FIG. 1 is simply referred to as "upper side", and the lower side in the vertical direction in FIG. 1 is simply referred to as "lower side". The upper side, the lower side, and the vertical direction are simply names for explaining the relative positional relationship of the respective parts, and the actual arrangement relationship and the like are not limited.

The stator 40 is disposed radially outward of the rotor 30. The stator 40 includes an annular stator core 41, an insulator 42 mounted on the stator core 41, and a coil 43 mounted on the stator core 41 via the insulator 42.

The housing 20 is in the shape of a cylinder accommodating respective portion of the motor 10. The bearing holder 50 has a substantially disk shape extending in the radial direction. The bearing holder 50 is disposed on the upper side of the stator 40. The bearing holder 50 holds a bearing that rotatably supports the shaft 31 on the upper side of the rotor core 32.

The bus bar unit 60 has a substantially disk shape extending in the radial direction as a whole. The bus bar unit 60 is disposed on the upper side of the stator 40. More specifically, the bus bar unit 60 is fixed to the upper surface of the bearing holder 50. The bus bar unit 60 includes five bus bars (a first bus bar 71, a second bus bar 72, a third bus bar 73, a fourth bus bar 74, and a fifth bus bar 75), and a bus bar holder 60*a*.

The bus bar holder 60*a* holds the first bus bar 71 to the fifth bus bar 75. As shown in FIGS. 1 to 3, the bus bar holder 60*a* has a substantially disk shape extending in the radial direction. The bus bar holder 60*a* is fitted to the radially inner side of the housing 20. The lower surface of the bus bar holder 60*a* is in contact with the upper surface of the bearing holder 50. The bus bar holder 60*a* is made of resin, for example. As shown in FIG. 2, the bus bar holder 60*a* has a plurality of fixing pins 67.

The bus bar holder 60*a* supports the first bus bar 71 to the fifth bus bar 75 from lower side. The first bus bar 71 to the fifth bus bar 75 are fixed to the bus bar holder 60*a* by a plurality of fixing pins 67. The first bus bar 71 to the fifth bus bar 75 have a bus bar fixing portion 70 which is a through-hole penetrating in the vertical direction. The fixing pin 67 is inserted into the hole of the bus bar fixing portion 70. Fixing method of the fixing pin 67 is not particularly limited. For example, as the fixing pin 67, a structure in which the upper end is welded in a hemispherical shape to fix the first bus bar 71 to the fifth bus bar 75, or a structure in which the first bus bar 71 to the fifth bus bar 75 are fixed by snap fitting, can be adopted. The bus bar fixing portion 70 is not limited to the through-hole, and may be a notch.

The bus bar holder 60a has a first holder through-hole 66c and a plurality of second holder through-holes 66d which vertically penetrate the bus bar holder 60a. The first holder through-hole 66c is disposed at the center of the bus bar holder 60a. The shape of the first holder through-hole 66c in planar view is a circular shape centered on the central axis J. As shown in FIG. 1, the shaft 31 is passed through the first holder through-hole 66c. As shown in FIGS. 2 and 3, a plurality of second holder through-holes 66d is formed along the circumferential direction. The second holder through-hole 66d has a circular shape in planar view. A coil wire 43a drawn out from the coil 43 is passed through the second holder through-hole 66d.

The first bus bar 71 to the fifth bus bar 75 are plate-shaped. The first bus bar 71 to the fifth bus bar 75 are electrically connected to the stator 40. More specifically, the first bus bar 71 to the fifth bus bar 75 are electrically connected to the coil 43 via the coil wire 43a extended upper side from the coil 43. As shown in FIG. 1, the coil wire 43a passes through a hole penetrating the bearing holder 50 in the vertical direction and the second holder through-hole 66d, and is drawn to the upper side of the bus bar holder 60a. The coil wire 43a is an end portion of a conductor wire constituting the coil 43.

As shown in FIG. 2, in the present example embodiment, the first bus bar 71, the second bus bar 72, and the third bus bar 73 are phase bus bars. The fourth bus bar 74 and the fifth bus bar 75 are bus bars for neutral points. That is, in the motor 10, the plurality of coils 43 constitute a three-phase circuit connected by a star connection.

The plurality of coils 43 may constitute a plurality of connection systems. This makes it possible to supply current to the motor 10 even when a failure occurs in any one of the connection systems. The plurality of connection systems are composed of three-phase circuits in which coils included in the respective connection systems are connected by star connection.

The first bus bar 71 includes a bus bar body portion 71a, two coil connecting portions 76, and a terminal portion 77. The bus bar body portion 71a is in the form of an elongated plate shape extending along a plane orthogonal to the vertical direction. The plate surface of the bus bar body portion 71a is orthogonal to the vertical direction. That is, the first bus bar 71 is supported by the bus bar holder 60a with its plate surface facing in the vertical direction. The bus bar body portion 71a has a first portion 71b and a second portion 71c.

The first portion 71b extends at radially outside of the second holder through-hole 66d in an arc shape along the circumferential direction. The coil connecting portion 76 is connected to one end portion of the first portion 71b extending in the circumferential direction. The terminal portion 77 is connected to the other end portion of the first portion 71b. The second portion 71c extends radially inward from the middle of the first portion 71b extending in the circumferential direction. The second portion 71c extends from a connecting portion with the first portion 71b through a peripheral edge portion of the first holder through-hole 66c to a radial position of the second holder through-hole 66d on the opposite side. The coil connecting portion 76 is connected to the distal end portion of the second portion 71c.

A part of the second portion 71c of the bus bar body portion 71a extends in an arc shape along the peripheral edge of the first holder through-hole 66c. With this configuration, the second portion 71c traverses the upper surface 66a of the bus bar holder 60a through the vicinity of the first holder through-hole 66c located at the center of the bus bar holder 60a, so that the path can be shortened.

The second bus bar 72 is disposed on the opposite side of the first bus bar 71 in the radial direction with the central axis J therebetween. The second bus bar 72 has a bus bar body portion 72a, two coil connecting portions 76, and a terminal portion 77. The bus bar body portion 72a is in the form of an elongated plate shape extending along a plane orthogonal to the vertical direction. The plate surface of the bus bar body portion 72a is orthogonal to the vertical direction. That is, the second bus bar 72 is supported by the bus bar holder 60a with its plate surface facing in the vertical direction. The bus bar body portion 72a has a first portion 72b and a second portion 72c.

The first portion 72b extends at radially outside of the second holder through-hole 66d, linearly along the circumferential direction. The terminal portion 77 is connected to one end portion of the first portion 72b extending in the circumferential direction. The second portion 72c is connected to the other end portion of the first portion 72b. The second portion 72c extends radially inward from a connecting portion of the first portion 72b. The second portion 72c extends from a connecting portion with the first portion 72b through a peripheral edge portion of the first holder through-hole 66c to a radial position of the second holder through-hole 66d on the opposite side. The second portion 72c is connected to two coil connecting portions 76. The second portion 72c is connected to one of the coil connecting portions 76 in the vicinity of the end portion on the first portion 72b side. The second portion 72c is connected to the other coil connecting portion 76 at the end portion located opposite to the first portion 72b.

A part of the second portion 72c of the bus bar body portion 72a extends in an arc shape along the peripheral edge of the first holder through-hole 66c. With this configuration, the second portion 72c traverses the upper surface 66a through the vicinity of the first holder through-hole 66c located at the center of the bus bar holder 60a, so that the path can be shortened.

The third bus bar 73 is disposed over the first bus bar 71 and the second bus bar 72. That is, the third bus bar 73 crosses the first bus bar 71 and the second bus bar 72 in the top view. The third bus bar 73 has a bus bar body portion 73a, two coil connecting portions 76, and a terminal portion 77. The bus bar body portion 73a is in the form of an elongated plate shape extending along a plane orthogonal to the vertical direction. The plate surface of the bus bar body portion 73a is orthogonal to the vertical direction. That is, the third bus bar 73 is supported by the bus bar holder 60a with its plate surface facing in the vertical direction. The bus bar body portion 73a has a first portion 73b and a second portion 73c.

The first portion 73b linearly extends in the circumferential direction at the radially outer edge portion of the bus bar holder 60a. The terminal portion 77 is connected to one end portion of the first portion 73b extending in the circumferential direction. The second portion 73c is connected to the other end portion of the first portion 73b.

The second portion 73c extends radially inward from a connecting portion of the first portion 73b. The second portion 73c extends from a connecting portion with the first portion 73b through a peripheral edge portion of the first holder through-hole 66c to a radial position of the second holder through-hole 66d on the opposite side. The second portion 73c is connected to two coil connecting portions 76. The second portion 73c is connected to one of the coil connecting portions 76 in the vicinity of the end portion on the first portion 73b side. The second portion 73c is connected to the other coil connecting portion 76 at the end portion located opposite to the first portion 73b.

A part of the second portion 73c of the bus bar body portion 73a extends in an arc shape along the peripheral edge of the first holder through-hole 66c. With this configuration, the second portion 73c traverses the upper surface 66a through the vicinity of the first holder through-hole 66c located at the center of the bus bar holder 60a, so that the path can be shortened.

The third bus bar 73 crosses the first bus bar 71 and the second bus bar 72, in the bus bar body portion 73a. The bus bar body portion 73a has a bridge portion 170 that crosses over the first bus bar 71 and the second bus bar 72. The bridge portion 170 has an ascending portion 170a extending upward from the upper surface 66a of the bus bar holder 60a, an intermediate portion 170b extending in a direction along the upper surface 66a from the upper end of the ascending portion 170a, and a descending portion 170c extending downward from the end of the intermediate portion 170b.

The intermediate portion 170b of the bridge portion 170 is disposed at a position spaced to the upper side from the upper surface 66a of the bus bar holder 60a, by the ascending portion 170a and the descending portion 170c. The first bus bar 71 and the second bus bar 72 are passed between the intermediate portion 170b and the upper surface 66a of the bus bar holder 60a.

In the bus bar unit 60, since the third bus bar 73 crosses over the first bus bar 71 and the second bus bar 72, the third bus bar 73 can be guided in the radial direction passing through the vicinity of the first holder through-hole 66c. As a result, the length of the third bus bar 73 can be significantly shortened, as compared with the case where the third bus bar 73 is turned to the outside in the radial direction of the first bus bar 71 and the second bus bar 72. Since the mounting area of the first bus bar 71 to the third bus bar 73 is reduced on the upper surface 66a of the bus bar holder 60a, the restriction on the arrangement of other members such as external terminals is reduced. In the bus bar unit 60, since the first bus bar 71 to the third bus bar 73 are supported by the bus bar holder 60a with their plate surfaces facing in the vertical direction, it is possible to suppress an increase in the thickness of the bus bar unit 60 in the vertical direction. The third bus bar 73 may cross at the lower side of the first bus bar 71 and the second bus bar 72.

In the present example embodiment, one third bus bar 73 crosses over two bus bars, i.e., the first bus bar 71 and the second bus bar 72. According to this configuration, since it is preferable to install the bridge portion 170 only on the third bus bar 73 to avoid short-circuit, it is possible to suppress the manufacturing process from becoming complicated.

A part of the intermediate portion 170b extends in an arc shape along the peripheral edge of the first holder through-hole 66c. That is, a part of the bridge portion 170 extends in an arc shape along the peripheral edge of the first holder through-hole 66c. With this configuration, the path of the bridge portion 170 in the vicinity of the first holder through-hole 66c can be shortened.

The arc-shaped portion of the intermediate portion 170b partially overlaps a portion extending in an arc shape along the peripheral edge of the first holder through-hole 66c of the first bus bar 71 and a portion extending in an arc shape along the peripheral edge of the first holder through-hole 66c of the second bus bar 72 in a top-view. That is, the bridge portion 170 crosses over the radially innermost portions of the first bus bar 71 and the second bus bar 72. This makes it possible to shorten the length of the intermediate portion 170b disposed upper side away from the bus bar holder 60a. Since the portion where the intermediate portion 170b is disposed is a portion where the bus bar unit 60 is thickened in the vertical direction, by shortening the length of the intermediate portion 170b, the installation space of the bus bar unit 60 in the housing 20 can be reduced.

The bus bar body portion 73a has a first main body portion 171 and a second main body portion 172 extending on both sides of the bridge portion 170. The first main body portion 171 extends radially outward from the lower side end portion of the ascending portion 170a, and is connected to one of the coil connecting portions 76. The second main body portion 172 extends radially outward from the lower side end portion of the descending portion 170c, and is connected to the other coil connection portion 76. The first main body portion 171 and the second main body portion 172 have radially inward of the coil connecting portion 76, a bus bar fixing portion 70 formed of a through-hole which the fixing pin 67 is inserted.

The bus bar body portion 73a is fixed to the bus bar holder 60a at the bus bar fixing portion 70 of the first main body portion 171 and the bus bar fixing portion 70 of the second main body portion 172 located on both sides of the bridge portion 170. As a result, since both ends of the bridge portion 170 are fixed to the upper surface 66a, it is possible to reduce the movement of the intermediate portion 170b disposed at a position floating from the bus bar holder 60a, and can suppress contact between bus bars of between the bus bars and other members.

The bus bar fixing portion 70 of each of the first main body portion 171 and the second main body portion 172 is located radially inward of the coil connecting portion 76. As a result, since the bus bar fixing portion 70 is not disposed on the outer peripheral portion of the bus bar holder 60a, the outer peripheral region can be used as a guiding region of the coil wire 43a or an installation space of the terminal portion 77 and the like. Therefore, the space on the bus bar holder 60a can be efficiently utilized.

The bus bar body portion 73a has a bus bar fixing portion 70A formed of a through-hole, at an intermediate portion 170b of the bridge portion 170. The bus bar holder 60a has a protruding portion 66b protruding upward from the upper surface 66a, at a position overlapping with the intermediate portion 170b in a top-view. The fixing pin 67A is disposed on the upper surface of the protruding portion 66b. The intermediate portion 170b is disposed on the upper surface of the protruding portion 66b, and the fixing pin 67A is inserted into the bus bar fixing portion 70. The intermediate portion 170b is fixed to the protruding portion 66b by welding or the like of the fixing pin 67A. That is, the bus bar body portion 73a is fixed to the bus bar holder 60a at the bridge portion 170.

With this configuration, since the bridge portion 170 cannot move to upper side from the position fixed by the fixing pin 67A, insulation between the bridge portion 170 and other members in the housing 20 can be ensured. In addition, since the protruding portion 66b is disposed on the lower side of the intermediate portion 170b, the intermediate portion 170b cannot move to the lower side than the protruding portion 66b, insulation from other bus bars disposed on the upper surface 66a can be ensured.

The protruding portion 66b extends in an arc shape along the peripheral edge of the first holder through-hole 66c. As a result, it is possible to match the shape of the protruding portion 66b with the shape of the arc-shaped extending portion of the bridge portion 170, and can efficiently support the bridge portion 170 by the protruding portion 66b. Since a portion of the protruding portion 66b unnecessary for supporting the bridge portion 170 can be reduced, the space on the bus bar holder 60a can be efficiently used.

Further, the fixing pin 67A may not be disposed on the protruding portion 66b. The intermediate portion 170b may be disposed on the protruding portion 66b without being fixed. Even in this case, since the intermediate portion 170b cannot move to the lower side by the protruding portion 66b, insulation between the first bus bar 71 and the second bus bar 72 located on the upper surface 66a of the bus bar holder 60a can be ensured.

In the present example embodiment, a low-level protruding portion in which the protrusion height of the bus bar holder 60a from the upper surface 66a is smaller than the height of the protruding portion 66b, or a high-level protruding portion in which the protrusion height is greater than the protruding portion 66b, may be provided. By arranging the first bus bar 71 or the second bus bar 72 on the upper surface of the low-level protruding portion or the upper surface of the high-level protruding portion, three bus bars can be disposed at mutually different vertical positions. This makes it difficult for the bus bars to come into contact with each other, thereby ensuring insulation.

The fourth bus bar 74 has a bus bar body portion 74a and three coil connecting portions 76. The bus bar body portion 74a is in the form of an elongated plate shape extending along a plane orthogonal to the vertical direction. The plate surface of the bus bar body portion 74a is orthogonal to the vertical direction. That is, the fourth bus bar 74 is supported by the bus bar holder 60a with its plate surface facing in the vertical direction.

The bus bar body portion 74a extends radially outward of the second holder through-hole 66d in a substantially arc-shape along the circumferential direction. The bus bar body portion 74a branches in three from the both ends in the circumferential direction and a center portion in the circumferential direction, and extends to three second holder through-holes 66d. The bus bar body portion 74a is connected to the coil connecting portions 76 at the position of each second holder through-holes 66d.

The fifth bus bar 75 is disposed on the opposite side of the fourth bus bar 74 in the radial direction with the central axis J therebetween. In the present example embodiment, the shape of the fifth bus bar 75 is the same as the shape of the fourth bus bar 74. The fifth bus bar 75 and the fourth bus bar 74 are disposed point symmetrically with respect to the central axis J in planar view.

The fifth bus bar 75 has a bus bar body portion 75a and three coil connecting portions 76. The bus bar body portion 75a is in the form of an elongated plate shape extending along a plane orthogonal to the vertical direction. The plate surface of the bus bar body portion 75a is orthogonal to the vertical direction. That is, the fifth bus bar 75 is supported by the bus bar holder 60a with its plate surface facing in the vertical direction.

The bus bar body portion 75a extends radially outward of the second holder through-hole 66d in a substantially arc-shape along the circumferential direction. The bus bar body portion 75a branches in three from the both ends in the circumferential direction and a center portion in the circumferential direction, and extends to three second holder through-holes 66d. The bus bar body portion 75a is connected to the coil connecting portions 76 at the position of each second holder through-holes 66d.

The coil connecting portion 76 is a portion that holds the coil wire 43a. As described above, the coil connecting portion 76 is provided on each of the first bus bar 71 to the fifth bus bar 75. In the present example embodiment, twelve coil connecting portions 76 are provided. The shape of the coil connecting portion 76 in a planar view is substantially U-shaped that opens radially outward. The plate surface of the coil connecting portion 76 is parallel to the vertical direction. Each of the coil connecting portions 76 is disposed at a position overlapping with the second holder through-hole 66d in a planar view. As shown in FIG. 3, the coil connecting portion 76 is disposed at the upper side of the bus bar body portions 71a to 75a.

The coil connection portion 76 has two arm portions extending outward in the radial direction. A coil wire 43a is disposed between the two arm portions. From the state of the coil connecting portion 76 shown in FIG. 2, by plastically deforming the coil connecting portion 76 in the direction in which the two arm portions approach each other, the coil wire 43a can be grabbed in the circumferential direction by the two arm portions. In this state, the coil wire 43a and the arm portion are fixed by, for example, welding, and the coil wire 43a and the coil connecting portion 76 are electrically connected to each other.

The terminal portion 77 is provided on each of the first bus bar 71, the second bus bar 72, and the third bus bar 73. That is, in the present example embodiment, three terminal portions 77 are provided. The three terminal portions 77 extend to the upper side from the bus bar body portions 71a, 72a, and 73a, respectively. The plate surface of the terminal portion 77 is orthogonal to the circumferential direction. As shown in FIG. 1, the upper end of the terminal portion 77 is electrically connected to the control device 80. As shown in FIG. 2, the three terminal portions 77 are disposed at equal intervals along the circumferential direction.

Each of the first bus bar 71, the second bus bar 72, and the third bus bar 73 has a bus bar fixing portion 70 formed of a through-hole, at a corner portion at which the bus bar body portions 71a, 72a, and 73a bend in a plane orthogonal to the vertical direction.

The bus bar body portion 71a has a corner portion 71A in a portion extending from a connection portion with the second portion 71c to the terminal portion 77, in the first portion 71b extending in the circumferential direction. The bus bar body portion 71a has a bus bar fixing portion 70 at a corner portion 71A. The bus bar body portion 72a has a corner portion 72A at a portion where the first portion 72b and the second portion 72c are connected to each other. The bus bar body portion 72a has a bus bar fixing portion 70 at a corner portion 72A. The bus bar body portion 73a has a corner portion 73A at a portion where the first portion 73b and the second portion 73c are connected to each other. The bus bar body portion 73a has a bus bar fixing portion 70 at a corner portion 73A.

By providing the bus bar fixing portions 70 in the corner portions 71A to 73A, even when the terminal portion 77 moves up and down, the second portions 71c, 72c, and 73c on the inner side in the radial direction can hardly be floated.

As shown in FIG. 1, the control device 80 is disposed on the upper side of the stator 40. The control device 80 controls the current supplied to the stator 40 through the first bus bar 71, the second bus bar 72, and the third bus bar 73.

Therefore, the number of revolutions of the motor 10 can be controlled. The control device 80 is connected to an external power source (not shown).

Next, an example embodiment of an apparatus for mounting the motor 10 of the present example embodiment will be described.

Figure 4:
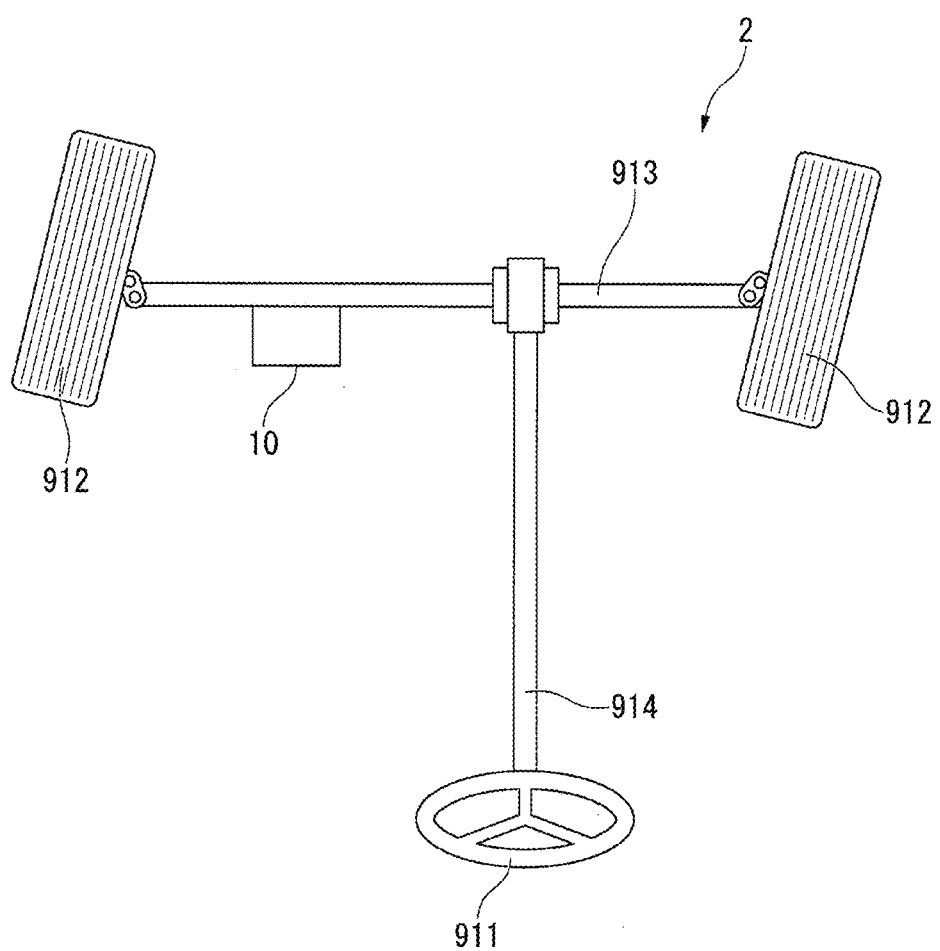
FIG. 4 is a schematic diagram showing an electric power steering device of an example embodiment of the present disclosure.

In the present example embodiment, an example in which the motor 10 is mounted on an electric power steering device will be described. FIG. 4 is a schematic diagram showing an electric power steering device 2 of the present example embodiment.

The electric power steering device 2 is mounted on a steering mechanism of a wheel of an automobile. The electric power steering device 2 of the present example embodiment is a rack-type power steering device that directly reduces the steering force by the power of the motor 10. The electric power steering device 2 includes a motor 10, a steering shaft 914, and an axle 913.

The steering shaft 914 transmits an input from the steering 911 to the axle 913 having wheels 912. The power of the motor 10 is transmitted to the axle 913 through a ball screw (not shown). Since the motor 10 employed in the rack-type electric power steering device 2 is attached to the axle 913 and is exposed to the outside, a waterproof structure is required.

The electric power steering device 2 of the present example embodiment includes the motor 10 of the present example embodiment. Therefore, the electric power steering device 2 exhibiting the same effect as the motor 10 of the present example embodiment can be obtained. Although the electric power steering device 2 has been described as an example of the method of using the motor 10 of the present example embodiment, the method of using the motor 10 is not limited.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A bus bar unit comprising:
    a bus bar holder; and
    three bus bars;
    the bus bar holder being provided on an upper side of a stator disposed in a ring around a central axis extending in a vertical direction;
    the three bus bars being supported by the bus bar holder and connected to coil wires extending from the stator;
    the three bus bars including plate-shaped conductors supported by the bus bar holder with a plate surface facing in the vertical direction;
    the three bus bars including a plurality of coil connecting portions connected to the coil wires, and a bus bar body portion connecting the coil connecting portions through a radially inner side of the plurality of the coil connecting portions, respectively;
    at least one of the three bus bars crosses over an upper side or a lower side of at least another one of the three bus bars;
    a first holder through-hole penetrates a center portion of the bus bar holder in the vertical direction; and
    a portion of the bus bar body portion extends along a peripheral edge of the first holder through-hole.

2. The bus bar unit according to claim 1, wherein one of the three bus bars crosses over the other two of the three bus bars.

3. The bus bar unit according to claim 1, wherein
    the bus bar is disposed on an upper surface of the bus bar holder;
    the bus bar body portion of at least one of the three bus bars includes a bridge portion including an ascending portion bent to the upper side and extending to the upper side from the upper surface of the bus bar holder, an intermediate portion extending from the ascending portion in a direction along the upper surface of the bus bar holder, and a descending portion extending to lower side from the intermediate portion; and
    the at least one bus bar crosses over the other two of the three bus bars at the bridge portion.

4. The bus bar unit according to claim 3, wherein at least a portion of the bridge portion extends along a peripheral edge of the first holder through-hole.

5. The bus bar unit according to claim 3, wherein
    the bus bar body portion includes a first body portion extending from the ascending portion of the bridge portion to one of the coil connecting portions, and a second body portion extending from the descending portion of the bridge portion to the other of the coil connecting portions; and
    the bus bar body portion is fixed to the bus bar holder in the first body portion and the second body portion.

6. The bus bar unit according to claim 5, wherein the bus bar body portion is fixed to the bus bar holder at the first body portion and the second body portion located radially inward of the coil connecting portion.

7. The bus bar unit according to claim 3, wherein the bus bar body portion is fixed to the bus bar holder at the bridge portion.

8. The bus bar unit according to claim 3, wherein
    the bus bar unit includes a protruding portion protruding upward from the upper surface; and
    at least a portion of the bridge portion is disposed on the protruding portion.

9. The bus bar unit according to claim 8, wherein the protruding portion and the bridge portion are fixed.

10. The bus bar unit according to claim 3, wherein the protruding portion extends along the peripheral edge of the first holder through-hole.

11. The bus bar unit according to claim 1, wherein
    the bus bar includes a bus bar fixing portion including a hole or a notch passing through the bus bar body portion in the vertical direction;
    the bus bar holder includes a fixing pin protruding to upper side; and
    the bus bar is fixed to the bus bar holder in a state in which the fixing pin extends through the bus bar fixing portion.

12. The bus bar unit according to claim 11, wherein the bus bar body portion includes the bus bar fixing portion at a corner portion bent in a direction orthogonal to the vertical direction.

13. The bus bar unit according to claim 1, wherein
    the three bus bars are phase bus bars; and
    the three bus bars are provided with neutral-point bus bars supported by the bus bar holder.

14. A motor comprising:
    the stator according to claim 1 including a wound coil wire;
    a rotor facing the stator with a gap therebetween;

a shaft rotatably supporting the rotor about the central axis; and the bus bar unit according to claim 1 located on the upper side of the stator.

15. The motor according to claim 14, wherein the coil wire defines a star-connected three-phase circuit.

16. The motor according to claim 14, wherein the coil wire defines a plurality of three-phase coil sets.

17. An electric power steering device comprising the motor according to claim 14.

* * * * *